Aug. 4, 1970
P. A. DOLTER
3,522,601
PLUNGER-TYPE SOUND LEVEL ADJUSTABLE BUZZER
Filed Dec. 26, 1968
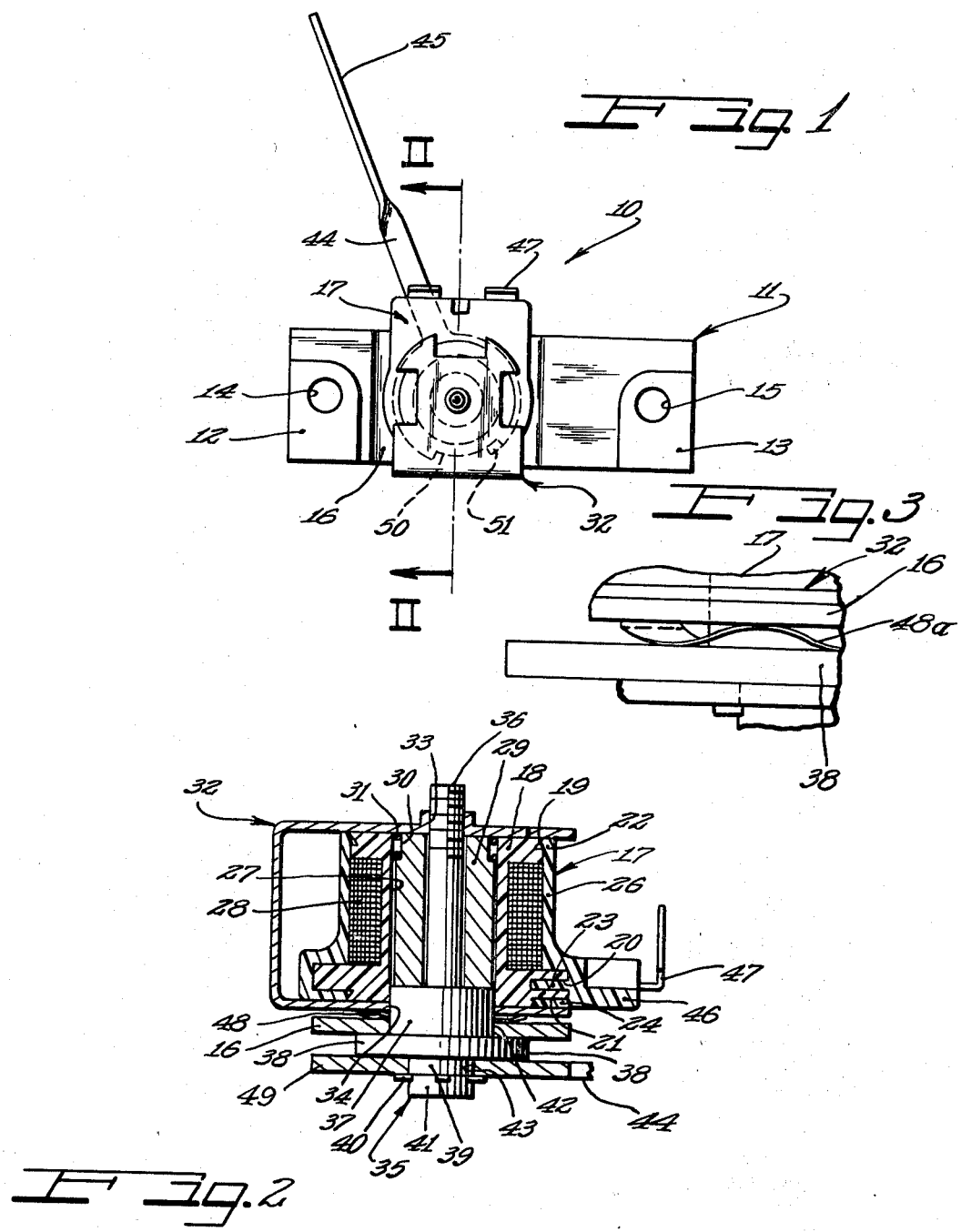
INVENTOR.
Paul A. Dolter
BY Hill, Sherman, Meroni, Gross & Simpson    ATTORNEYS

United States Patent Office 3,522,601
Patented Aug. 4, 1970

3,522,601
PLUNGER-TYPE SOUND LEVEL ADJUSTABLE BUZZER
Paul A. Dolter, Roselle, Ill., assignor to Eaton Yale & Towne Inc., Morton Grove, Ill., a corporation of Ohio
Filed Dec. 26, 1968, Ser. No. 786,898
Int. Cl. G10k 9/12
U.S. Cl. 340—392                  11 Claims

ABSTRACT OF THE DISCLOSURE

A plunger-type adjustable buzzer employs a centrally disposed rotatable screw which cooperably engages a C-shaped plunger retaining element. The rotatable screw provides for calibration of the plunger and adjustment of the output noise level while at the same time securing the plunger within the housing of the buzzer.

BACKGROUND OF THE INVENTION

Field of the invention

This invention relates to buzzer apparatus and is more particularly concerned with adjustable buzzer apparatus of the type wherein a plunger is caused to vibrate between adjustable extreme positions.

Description of the prior art

Heretofore, buzzers having a variable output level have employed a rotatable shaft which moves longitudinally of the buzzer assembly to vary the distance a vibrating element may be permitted to travel. A major drawback of such a buzzer resides in the difficulty of designing control panels which provided for this longitudinal movement of a manual operating knob which was coupled to a shaft. Difficulties were also encountered in such buzzers wherein the mounting brackets necessarily designed to account for longitudinal travel of the adjusting screw so that the knobs on the exterior of a control panel did not bottom, and thus loosen, as such knobs came in contact with the control panel. Further, some of the prior designs have incorporated open housings which may lead to malfunctions caused by dirt, metal chips, lint or other exotic material.

SUMMARY OF THE INVENTION

The present invention overcomes the above disadvantages of prior adjustable buzzers by providing a buzzer which has a mounting bracket for bearing against the adjustment shaft wherein there is no give in the assembly and wherein a rotatably mounted screw may or may not travel longitudinally of the buzzer, in accordance with the relative positioning of the components of the buzzer. Advantageously then, exterior knobs connected to the screw may be provided with a shaft of any desired length and such knob will be maintained at a desired distance from the buzzer throughout its full range of adjustment. By the same token, when screw travel is not critical, the relative positioning of the components may permit such travel. Further, the buzzer is as easily effective with a control lever, rather than a control knob, wherein a slot of desired dimension may be placed in a control panel. The buzzer includes a hollow bobbin defining a bore in which a vibrating plunger is disposed. The bobbin includes a pair of oppositely disposed flanges between which is wound a coil for connection to a source of alternating current. A C-shaped member straddles the housing and has an aperture in one leg thereof for receiving a screw and a threaded aperture in the other leg thereof for engaging the threads of the screw. The screw extends through a bore in the plunger and is rotatably adjustable to vary a gap between the plunger and the leg of the C-shaped member having the threaded aperture. The screw has a head of several sections having different diameters one of which is disposed in sliding engagement with a mounting bracket. The disposition of a wave spring between the mounting bracket and C-shaped member or between the mounting bracket and the adjacent screw head determines longitudinal movement of the screw.

BRIEF DESCRIPTION OF THE DRAWINGS

The invention, its organization, construction and operation will be best understood from the following detailed description taken in conjunction with the accompanying drawing, in which:

FIG. 1 is a top plan view of an adjustable buzzer according to the invention;

FIG. 2 is a sectional elevational view of the buzzer of FIG. 1 taken along the line II—II; and FIG. 3 is a sectional fragmentary view of a modification of the wave spring position of FIG. 2.

DESCRIPTION OF THE PREFERRED EMBODIMENT

In the drawing, an adjustable buzzer is generally shown at 10. The adjustable buzzer 10 comprises a mounting bracket 11 which includes mounting portions 12 and 13 having apertures 14 and 15 therein, respectively. Mounting bracket 11 also includes a saddle portion 16 which carries the housing 17.

Housing 17 includes a bobbin 18 of insulating material having oppositely disposed flanges including grooves 19, 20 and 21 for respectively receiving filler ridges 22, 23 and 24 of encapsulating material 26 to hermetically seal winding 28. Plunger 29, preferably of cold rolled steel, is slidably disposed in bore 27 of the bobbin and includes a section 30 of smaller diameter which, together with the wall of bore 27, provides a space for spring 31. Spring 31 urges plunger 29 away from the upper leg of C-shaped member 32.

C-shaped member 32, preferably of cold rolled steel, straddles the housing of buzzer 10 to complete the magnetic circuit of winding 28, and includes a pair of apertures 33 and 34 for receiving screw 35. Screw 35 includes a threaded end 36 for engagement with the threaded aperture 33 whereby the buzzer may be initially and automatically calibrated by rotating screw 35 clockwise until plunger 29 is held between screw portion 37 and the upper leg of member 32 with zero air gap between plunger 29 and member 32. Inasmuch as the plunger so positioned is not free to vibrate under such conditions, this corresponds to an OFF position. Knowing this OFF position, the screw 35 may be rotatably orientated to the buzzer without further adjustment of any element of the buzzer. A counterclockwise rotation of screw 35 will, of course, increase the aforementioned air gap and provide a greater output noise level. A wave spring 48 is provided between the lower leg of member 32 and saddle portion 16 of mounting bracket 11. An embossed or folded out portion (not shown) of C-shaped member 32 engages a slot (not shown) in the saddle portion 16 of mounting bracket 11 to prevent mutual rotation of these two elements and provide relative rotation therefor.

Saddle portion 16 includes an aperture 42 for receiving portion 37 of screw 35. Screw 35 also includes a portion 38 of larger diameter than portion 37 which is mounted for continuous slidable engagement with the bottom surface of saddle portion 16. Screw 35 is therefore prevented from traveling longitudinally along its axis by the saddle portion 16 of mounting bracket 11, the upper leg of C-shaped bracket 32 being the only component, other than plunger 29 and springs 31 and 48, which has a component of movement longitudinally of the buzzer.

In FIG. 3 the wave spring 48a is positioned between the mounting bracket saddle 16 and the section 38 of screw 35 to permit the screw longitudinal movement.

Screw 35 includes an adjustment shaft portion 39 which may be of any desired length and may also be adapted to be secured to an adjusting knob; however, in this particular illustration output shaft 39 is connected to a lever for adjustment. This lever includes a handle portion 45 and a connecting portion 49 with a portion 44 therebetween. Lever portion 49 includes an aperture 43 therein for receiving output shaft 39. Connecting section 49 is affixed to the output shaft 39 by any suitable means, the illustrated version showing a staking connection by protrusions 40 just above the end 41 of shaft 39.

In the embodiment illustrated herein the handle 45 may be moved in an arc of approximately 45°, connecting section 49 having arcuate turnout 50 in the edge thereof which receives a stop 51 which may be fixed to or formed an integral part of the saddle portion 16 of mounting bracket 11. Such a stop 51 could also be formed as an integral part of C-shaped member 32.

Housing 17 further includes a boss portion 46 which encapsulates electrical terminals 47 which are connected to winding 28. Terminals 47 may be of any well known type for receiving an electrical connection to a source of alternating current, for example, a 120 volt, 50/60 cycle service for establishing an alternating magnetic field at winding 28 for exciting plunger 29 into a vibratory motion.

Many changes and modification may be provided by those skilled in the art, for example, the threaded aperture 33 may be replaced by a pair of integrally formed and oppositely disposed tabs which function as threads as is well known in the field of the fastening devices.

Many other changes and modifications may be made in the invention by one skilled in the art without departing from the spirit and scope thereof as defined in the appended claims.

What I claim as my invention is:

1. A buzzer comprising:
 a housing including wall means defining a bore through said housing;
 a plunger slidably disposed within the bore of the housing and having a bore therethrough;
 a rotatably mounted shaft including a threaded first portion extending through the bore of the plunger and a second portion extending into one end of the bore of said housing;
 fastening means secured to said housing and including threaded means for engaging said threaded first portion of said shaft disposed adjacent the other end of the bore of the housing; said fastening means being movable longitudinally of the shaft to vary the effective length of the bore of the housing;
 means inductively linked to said plunger for connection to a source of alternating current to establish a magnetic field for vibrating said plunger longitudinally of the housing.

2. The buzzer set forth in claim 1 comprising spring means disposed between said plunger and said fastening means for urging said plunger away from said fastening means.

3. The buzzer set forth in claim 1 wherein said fastening means has a C-shaped cross section including two legs and includes said threaded means in one leg and an aperture in the other leg for receiving said shaft.

4. The buzzer set forth in claim 3, wherein said shaft includes a plurality of portions at one end thereof each of said plurality of shaft portions having a different diameter, said second shaft portion included in said plurality and extending through the aperture in said other leg of said C-shaped fastening means.

5. The buzzer set forth in claim 1, comprising means coupled to said shaft for limiting rotation thereof to less than 180°.

6. The buzzer set forth in claim 1, comprising lever means coupled to said shaft including means for limiting adjustable rotation of said shaft to approximately 45°.

7. A buzzer comprising:
 a bobbin including a longitudinal bore and a pair of spaced-apart flanges each having at least one annular groove therein;
 plunger means slidably disposed in the longitudinal bore of said bobbin, said plunger means being cylindrical and including a section of reduced diameter at one end thereof and having a longitudinal bore;
 winding means for connection to source of alternating current carried on said bobbin between said pair of flanges and inductively coupled to said plunger means for causing said plunger means to vibrate longitudinally upon energization;
 sealing means covering said winding means and including annular ridges which extend into said annular grooves;
 a mounting bracket including a flat portion having an aperture therein;
 fastening means having a C-shaped cross-section affixed to said mounting bracket and including a first leg adjacent one of said flanges and a second leg adjacent the other of said flanges and having a threaded first aperture in said first leg and a second aperture in said second leg, the bores of said bobbin and said plunger means and the apertures of said fastening means and said mounting bracket being axially aligned;
 screw means including a threaded first section extending through the bore of said plunger means for engaging the threaded first aperture of said fastening means, a second section extending through the aperture of said mounting bracket and said second aperture of said fastening means and into the bore of said bobbin, and a third section of a diameter larger than said second section disposed adjacent the flat portion of said mounting bracket;
 means coupled to said screw means for rotating said screw means to move said first leg of said fastening means longitudinally of said screw means; and
 spring means disposed circumferentially about the reduced diameter section of said plunger means and bearing against said plunger means and said first leg of said fastening means to urge said plunger away from said first leg and against said second section of said screw means.

8. The buzzer according to claim 7, comprising second spring means disposed between and bearing against said second leg and said mounting bracket.

9. The buzzer according to claim 8, wherein said second spring means includes a wave spring.

10. The buzzer according to claim 7, comprising second spring means disposed between and bearing against said mounting bracket and said third section of said screw means.

11. The buzzer according to claim 10, wherein said second spring means includes a wave spring.

References Cited

UNITED STATES PATENTS 2,913,715 11/1959 Myrgren et al. _____ 340—384

HAROLD I. PITTS, Primary Examiner

U.S. CL. X.R.

340—384, 396, 400, 401